UNITED STATES PATENT OFFICE.

JAMES M. ALLISON, OF INDIANAPOLIS, INDIANA.

BEVERAGE EXTRACT.

1,093,962.

Specification of Letters Patent. Patented Apr. 21, 1914.

No Drawing. Application filed March 10, 1913. Serial No. 753,367.

*To all whom it may concern:*

Be it known that I, JAMES M. ALLISON, a citizen of the United States, residing at Indianapolis, in the county of Marion and State of Indiana, have invented certain new and useful Improvements in Beverage Extracts, of which the following is a specification.

The object of this invention is to provide an extract which is readily soluble in water and which will possess a pleasant, bitter flavor and empyreumatic aroma and is healthful and nutritious without the presence of tannin and caffein in injurious or noticeable quantities.

In carrying out my invention I preferably employ the coffee bean or berry from which all of the outside hull and blossom or bran-like lining is removed by any of the well known mechanical means leaving only the germ or portion originally wrapped within the blossom for my purpose. This is because most of the tannin and caffein and objectionable alkaloids exist in the discarded parts, while the heart is practically free from these objectionable elements but contains the essential oils which will impart the pleasant coffee flavor and aroma. Instead of using the coffee berry I can get very satisfactory results from roasted peas, beans, acorns, wheat and other cereals which are free from the objectionable tannins and alkaloids, but on account of the difference in flavor I prefer the coffee berry.

From the germ of the coffee berry thus obtained, or from the cereals if same are used insted of the coffee berry, I prepare a quickly soluble extract in a manner such that the flavor and aroma are retained; this is reduced to a dry, comminuted condition in rather a coarse granular form to better resist the hygroscopic tendencies of the product, although I may prepare it in any desired degree of fineness and preserve it in air and waterproof packages. The next step is to blend this comminuted extract of the coffee berry or cereal with the roasted and ground seeds of the cocoa tree in all of the well known commercial forms of prepared chocolate or cocoa. A third step is to blend with the resulting product milk or cream which has been evaporated and reduced to a soluble powder.

For the purpose of illustrating my invention the following specific example of its production is given without any purpose or intent to define or limit the invention further than is set forth in the appended claims. The coffee berries or berry germs from which the hulls have been removed are ground fine in roasted condition and are next treated with water to dissolve out the soluble constituents. Either a part or all of the soluble constituents may be removed depending upon the desired characteristics of the solid extract in the matter of aroma, flavor, etc. The extraction may be accomplished by adding cold or warm water, or boiling the same therewith, but I prefer to use percolation with water of moderate temperature, at about 50° to 60° C., in order to secure a clear solution which may be evaporated without being filtered and in order to permit of the control more readily of the strength of the extract produced. The resulting aqueous solution is next concentrated to dryness in a vacuum evaporation pan heated in the neighborhood of 50° C. in the early stages of the process care being taken at the close of the process to not overheat and burn the product. The thoroughly dried product is next comminuted, and is then ready to be mixed with from 50% to 80% of the dry comminuted product of the cocoa tree in the form of the well known commercial chocolate or cocoa which differs from chocolate principally in being ground with a portion of the hull, instead of being carefully hulled before grinding as is done in the manufacture of chocolate. The resulting mixture is then thoroughly stirred to make the distribution uniform throughout the mass, and to this mixture is then added from 15% to 30% of evaporated and finely comminuted milk or cream, or mixture of milk and cream, depending upon the percentage of butter fat desired in the finished product. All of the ingredients now present are thoroughly stirred together in order to equalize the mixture. In practice I prefer to dissolve the mixture thus produced in warm water, all of the ingredients being readily soluble, and then to evaporate the solution to dryness and grind it to a coarsely comminuted condition to thus better resist the hygroscopic tendencies of the product. The resulting product is a beverage extract in granular form of extreme solubility in water, either hot or cold, and when a teaspoonful of the extract is dissolved in a cup of hot water, solution is immediately effected producing a beverage having the aroma and flavor of coffee blended with the flavor and delicious taste of chocolate or cocoa. This beverage may be sweetened with sugar in the usual manner, or if preferred the product may be sweetened at the time that the powdered milk is added, but as tastes differ in regard to the amount of sweetening, it is preferable to allow each individual to add the sugar to suit his taste.

Having thus fully described my invention, what I claim as new and wish to secure by Letters Patent of the United States, is—

1. A solid soluble extract for preparing beverages consisting of extractive matter in hard, dry, homogeneous, comminuted condition of roasted coffee germs, roasted seeds of the cocoa tree and milk.

2. A solid soluble extract for preparing beverages consisting of extractive matter in hard, dry, homogeneous, comminuted condition of the roasted coffee-berry germs from which the hull has been removed and roasted seeds of the cocoa tree.

3. A solid soluble extract for preparing beverages consisting of extractive matter in hard, dry, homogeneous, comminuted condition of roasted coffee-berry germs from which the hull has been removed, roasted seeds of the cocoa tree and milk.

In witness whereof, I, have hereunto set my hand and seal at Indianapolis, Indiana, this, third day of March, A. D. one thousand nine hundred and thirteen.

JAMES M. ALLISON. [L. S.]

Witnesses:
F. W. WOERNER,
J. A. MINTURN.